(12) United States Patent
Kihara et al.

(10) Patent No.: US 12,739,238 B2
(45) Date of Patent: Sep. 15, 2026

(54) INFORMATION PROCESSING SYSTEM, INFORMATION PROCESSING METHOD, AND PROGRAM

(71) Applicant: NEC Corporation, Tokyo (JP)

(72) Inventors: Takayuki Kihara, Tokyo (JP); Shota Ono, Tokyo (JP); Yoshitaka Yoshimura, Tokyo (JP); Tomohisa Shimizu, Tokyo (JP); Shinichi Toriyama, Tokyo (JP); Masahiro Kiyosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/887,122

(22) Filed: Sep. 17, 2024

(65) Prior Publication Data

US 2025/0080522 A1 Mar. 6, 2025

Related U.S. Application Data

(63) Continuation of application No. 17/437,928, filed as application No. PCT/JP2020/009492 on Mar. 5, 2020, now Pat. No. 12,120,103.

(51) Int. Cl.
*H04L 9/40* (2022.01)

(52) U.S. Cl.
CPC ........ *H04L 63/0815* (2013.01); *H04L 63/102* (2013.01)

(58) Field of Classification Search
USPC .............................................................. 726/8
See application file for complete search history.

(56) References Cited

U.S. PATENT DOCUMENTS 6,826,692 B1 11/2004 White ..................... G06F 21/41 709/224
7,886,346 B2 2/2011 Sandhu ................. H04L 9/0825 713/163
8,544,072 B1 9/2013 Masone ............. H04L 63/0815 726/8
8,615,791 B1 12/2013 Cordell et al.
(Continued)

FOREIGN PATENT DOCUMENTS

CA 3053316 A1 * 8/2018 ............. G06F 21/64
JP 2006-053693 A 2/2006
(Continued)

OTHER PUBLICATIONS

International Search Report for PCT Application No. PCT/JP2020/009492, mailed on Jun. 23, 2020.
(Continued)

*Primary Examiner* — Sakinah White-Taylor
(74) *Attorney, Agent, or Firm* — NEC-IPC

(57) ABSTRACT

An account opening method includes receiving first authentication information for an account in response to receiving second authentication information which is entered on a user terminal and receiving information regarding the account which is specified on the user terminal, and executing a process for opening the account used by the first authentication information in response to receiving personal information for opening the account, the personal information being derived by the user terminal.

12 Claims, 11 Drawing Sheets

(56) References Cited

U.S. PATENT DOCUMENTS

| | | | | |
|---|---|---|---|---|
| 8,996,857 | B1 | 3/2015 | Akella | G06F 21/41 713/153 |
| 10,181,047 | B2 | 1/2019 | Lim | G06F 21/6218 |
| 11,093,598 | B2 * | 8/2021 | Chen | G06F 21/41 |
| 11,329,980 | B2 * | 5/2022 | Callahan | H04L 63/0823 |
| 2004/0158746 | A1 | 8/2004 | Hu | H04L 63/0815 726/8 |
| 2008/0133413 | A1 | 6/2008 | Bennett et al. | |
| 2009/0055915 | A1 | 2/2009 | Piliouras | G06F 21/41 726/8 |
| 2010/0116880 | A1 | 5/2010 | Stollman | G06Q 20/4014 235/380 |
| 2011/0047606 | A1 | 2/2011 | Blomquist et al. | |
| 2012/0144464 | A1 | 6/2012 | Fakhrai | H04L 63/0815 726/5 |
| 2013/0086669 | A1 | 4/2013 | Sondhi | H04W 12/068 726/8 |
| 2014/0020073 | A1 * | 1/2014 | Ronda | H04L 63/0853 726/7 |
| 2014/0081864 | A1 | 3/2014 | Reese | G06Q 40/02 705/44 |
| 2015/0269573 | A1 * | 9/2015 | Subbarao | G06Q 20/382 705/44 |
| 2015/0365399 | A1 * | 12/2015 | Biswas | H04L 63/0815 726/8 |
| 2017/0126661 | A1 * | 5/2017 | Brannon | H04L 63/0815 |
| 2020/0213114 | A1 * | 7/2020 | Sarin | H04L 9/3231 |

FOREIGN PATENT DOCUMENTS

| | | |
|---|---|---|
| JP | 2017-068777 A | 4/2017 |
| JP | 2018-074388 A | 5/2018 |

OTHER PUBLICATIONS

Extended European Search Report for EP Application No. 20776742.7 dated on Apr. 28, 2022.

* cited by examiner

1
USER TERMINAL
U1
USER TERMINAL
U2
AGENT SERVER (SECOND SERVER)
200
ACCOUNT-OPENING TASK SERVER (FIRST SERVER)
100
ID STORAGE UNIT
220
SECURITIES-COMPANY A PERSONAL-INFORMATION DB
120a
SECURITIES-COMPANY B PERSONAL-INFORMATION DB
120b 120
120a
SECURITIES-COMPANY A PERSONAL-INFORMATION DB
120b
SECURITIES-COMPANY B PERSONAL-INFORMATION DB
100
ACCOUNT-OPENING TASK MANAGEMENT SERVER
102
TRANSMISSION UNIT
104
PROCESSING UNIT
200
AGENT SERVER
202
ID REGISTRATION UNIT
204
LOGIN UNIT
220
ID STORAGE UNIT

FIG. 5A
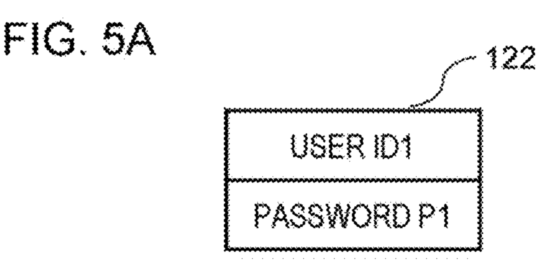
FIG. 5B
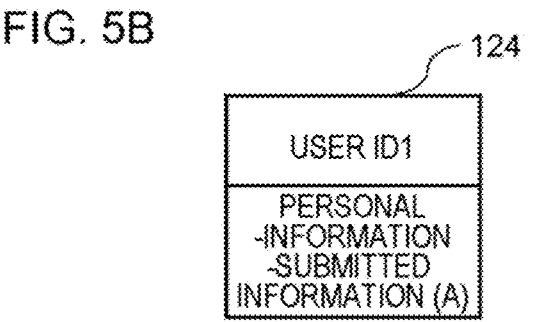
FIG. 5C
126
USER ID1
PERSONAL INFORMATION (MY NUMBER, MY -NUMBER CONFIRMATION DOCUMENT, AND IDENTITY VERIFICATION DOCUMENT)

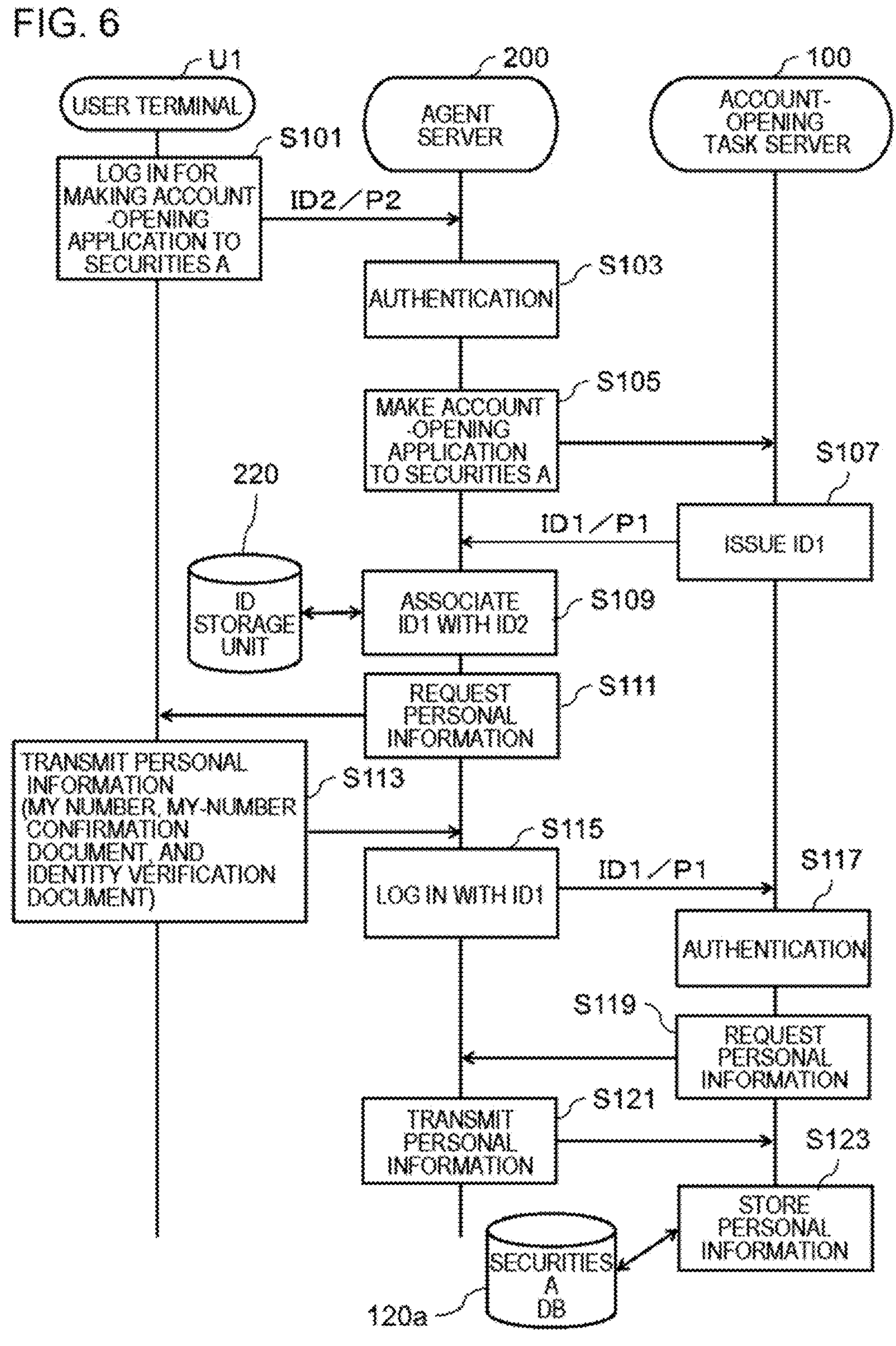
FIG. 6
U1
USER TERMINAL
200
AGENT SERVER
100
ACCOUNT-OPENING TASK SERVER
S101
LOG IN FOR MAKING ACCOUNT -OPENING APPLICATION TO SECURITIES A
ID2／P2
AUTHENTICATION
S103
MAKE ACCOUNT -OPENING APPLICATION TO SECURITIES A
S105
S107
220
ID1／P1
ISSUE ID1
ID STORAGE UNIT
ASSOCIATE ID1 WITH ID2
S109
REQUEST PERSONAL INFORMATION
S111
TRANSMIT PERSONAL INFORMATION (MY NUMBER, MY-NUMBER CONFIRMATION DOCUMENT, AND IDENTITY VERIFICATION DOCUMENT)
S113
S115
LOG IN WITH ID1
ID1／P1
S117
AUTHENTICATION
S119
REQUEST PERSONAL INFORMATION
TRANSMIT PERSONAL INFORMATION
S121
S123
STORE PERSONAL INFORMATION
SECURITIES A DB
120a

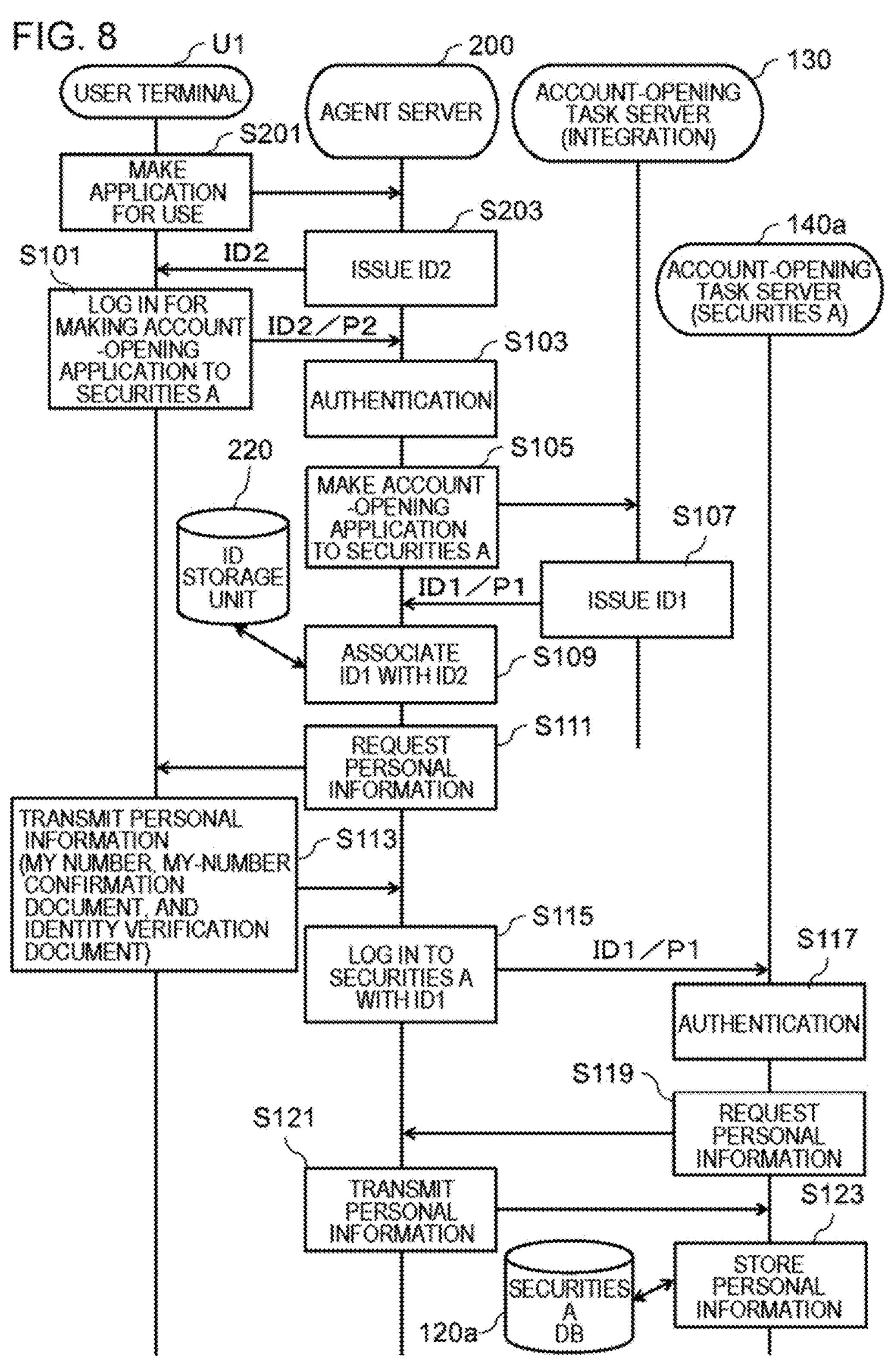
FIG. 8
U1
USER TERMINAL
200
AGENT SERVER
130
ACCOUNT-OPENING TASK SERVER (INTEGRATION)
S201
MAKE APPLICATION FOR USE
S203
ISSUE ID2
ID2
140a
ACCOUNT-OPENING TASK SERVER (SECURITIES A)
S101
LOG IN FOR MAKING ACCOUNT-OPENING APPLICATION TO SECURITIES A
ID2／P2
S103
AUTHENTICATION
220
S105
MAKE ACCOUNT-OPENING APPLICATION TO SECURITIES A
ID STORAGE UNIT
S107
ID1／P1
ISSUE ID1
ASSOCIATE ID1 WITH ID2
S109
S111
REQUEST PERSONAL INFORMATION
TRANSMIT PERSONAL INFORMATION (MY NUMBER, MY-NUMBER CONFIRMATION DOCUMENT, AND IDENTITY VERIFICATION DOCUMENT)
S113
S115
LOG IN TO SECURITIES A WITH ID1
ID1／P1
S117
AUTHENTICATION
S119
REQUEST PERSONAL INFORMATION
S121
TRANSMIT PERSONAL INFORMATION
S123
SECURITIES A DB
STORE PERSONAL INFORMATION
120a

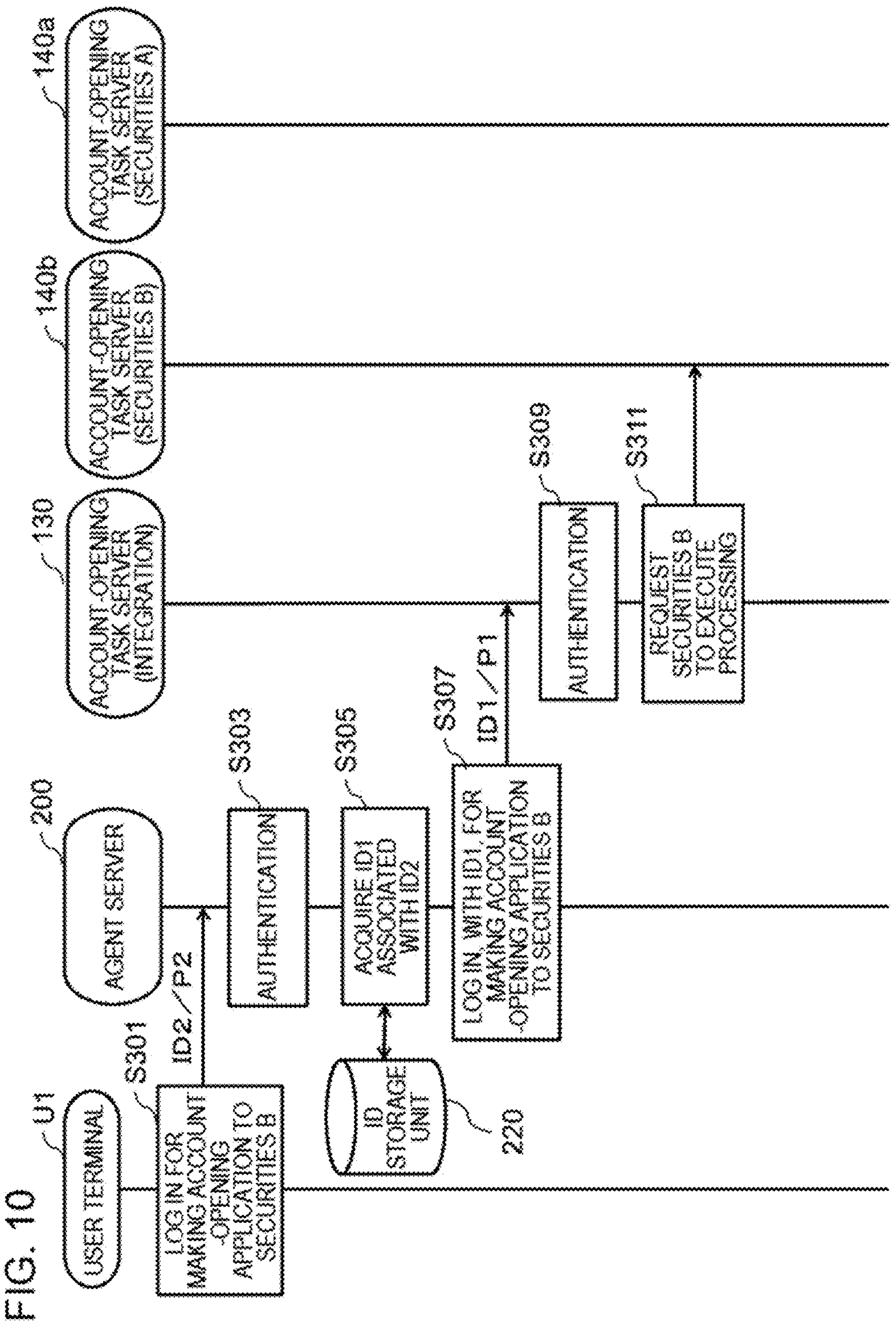
FIG. 10
USER TERMINAL
U1
AGENT SERVER
200
ACCOUNT-OPENING TASK SERVER (INTEGRATION)
130
ACCOUNT-OPENING TASK SERVER (SECURITIES B)
140b
ACCOUNT-OPENING TASK SERVER (SECURITIES A)
140a
S301
LOG IN FOR MAKING ACCOUNT -OPENING APPLICATION TO SECURITIES B
ID2／P2
S303
AUTHENTICATION
S305
ACQUIRE ID1 ASSOCIATED WITH ID2
ID STORAGE UNIT
220
S307
LOG IN, WITH ID1, FOR MAKING ACCOUNT -OPENING APPLICATION TO SECURITIES B
ID1／P1
S309
AUTHENTICATION
S311
REQUEST SECURITIES B TO EXECUTE PROCESSING

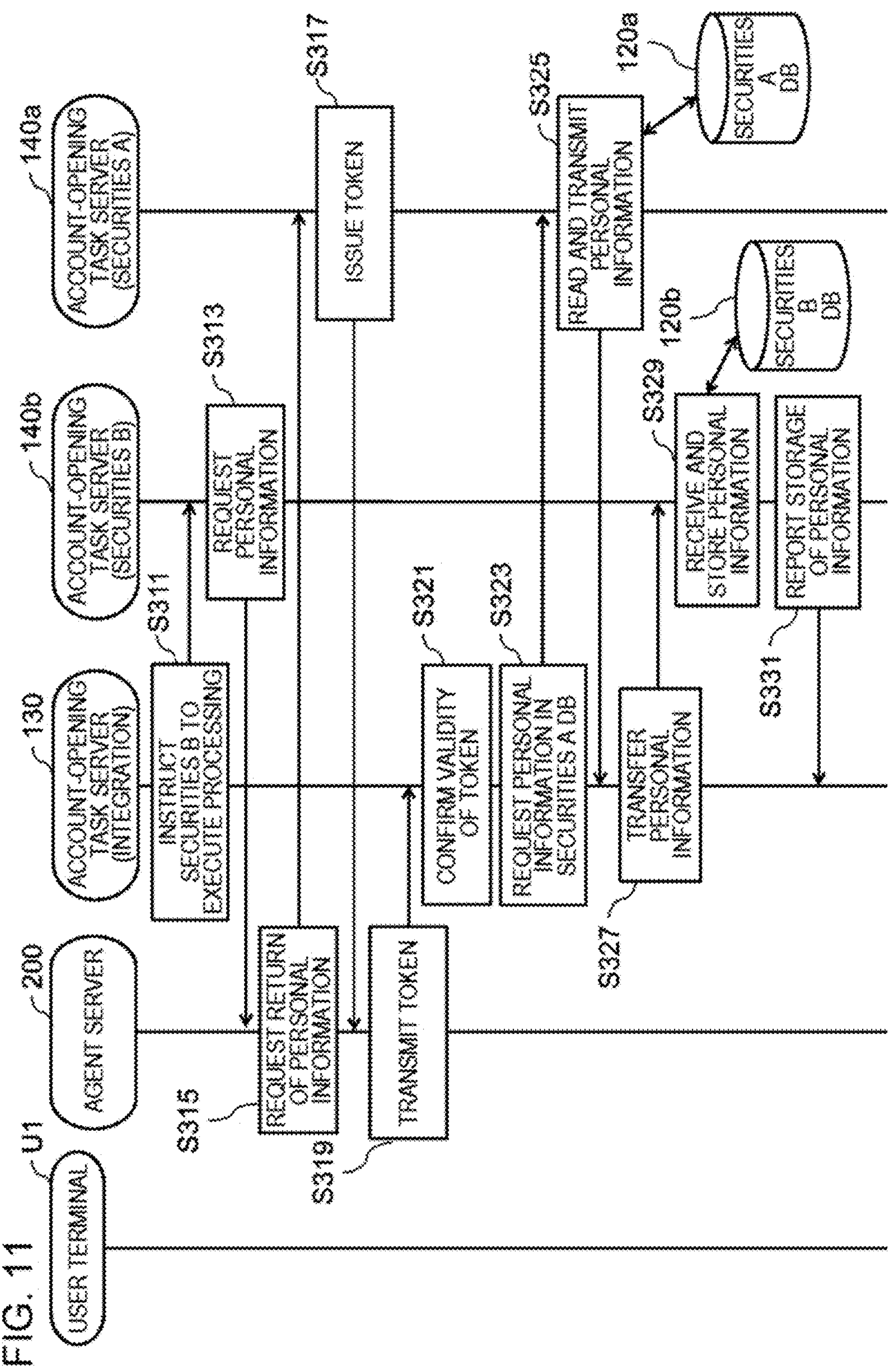
FIG. 11
USER TERMINAL
U1
AGENT SERVER
200
ACCOUNT-OPENING TASK SERVER (INTEGRATION)
130
ACCOUNT-OPENING TASK SERVER (SECURITIES B)
140b
ACCOUNT-OPENING TASK SERVER (SECURITIES A)
140a
INSTRUCT SECURITIES B TO EXECUTE PROCESSING
S311
REQUEST PERSONAL INFORMATION
S313
REQUEST RETURN OF PERSONAL INFORMATION
S315
ISSUE TOKEN
S317
TRANSMIT TOKEN
S319
CONFIRM VALIDITY OF TOKEN
S321
REQUEST PERSONAL INFORMATION IN SECURITIES A DB
S323
READ AND TRANSMIT PERSONAL INFORMATION
S325
SECURITIES A DB
120a
TRANSFER PERSONAL INFORMATION
S327
RECEIVE AND STORE PERSONAL INFORMATION
S329
SECURITIES B DB
120b
REPORT STORAGE OF PERSONAL INFORMATION
S331

INFORMATION PROCESSING SYSTEM, INFORMATION PROCESSING METHOD, AND PROGRAM

This application is a Continuation of U.S. application Ser. No. 17/437,928 filed on Sep. 10, 2021, which is a National Stage Entry of PCT/JP2020/009492 filed on Mar. 5, 2020, which claims priority from Japanese Patent Application 2019-054964 filed on Mar. 22, 2019, the contents of all of which are incorporated herein by reference, in their entirety.

TECHNICAL FIELD

The present invention relates to an information processing system, an information processing method, and a program.

BACKGROUND ART

PATENT DOCUMENT 1 describes a system capable of opening, when a securities transaction account is opened via one's bank, an account without submitting an identity verification document to a securities company. Further, PATENT DOCUMENT 2 describes a system in which by using a cash card of a company (a financial institution or the like) having already confirmed the identity of a user, information of the cash card of the company having already confirmed the identity is transmitted to a company (another financial institution or the like) to which the user newly applies for use (account-opening or the like) of a service and accordingly attribute information in which the identity of the user is already confirmed is provided from the company having already confirmed the identity, whereby the another company saves time and effort required for identity confirmation.

RELATED DOCUMENT

Patent Document

[PATENT DOCUMENT 1] Japanese Patent Application Publication No. 2006-53693

[PATENT DOCUMENT 2] Japanese Patent Application Publication No. 2017-68777

SUMMARY OF THE INVENTION

Technical Problem

As in the systems described in the documents described above, when personal information of a user is exchanged among a plurality of companies, it is necessary to keep the personal information from leaking.

In view of the circumstance described above, the present invention has been made, and an object of the present invention is to provide an information processing system, an information processing method, and a program that reduce a leakage risk of personal information.

Solution to Problem

Aspects according to the present invention each employ, in order to solve the above-described problem, the following configuration.

A first aspect relates to an information processing system.

The information processing system according to the first aspect is an information processing system including a first server and a second server, wherein the first server includes a transmission unit that transmits, to the second server, when storing user information of a user in a first storage unit, first authentication information for logging in to the first server with respect to the user, and a processing unit that executes, when receiving the first authentication information, processing of reading the user information of the user, and the second server includes an authentication-information storage unit that stores, in a second storage unit, second authentication information for the user to log in to the second server in association with the first authentication information, and a login unit that reads, when receiving the second authentication information, the first authentication information corresponding to the second authentication information from the second storage unit and logs in to the first server.

A second aspect relates to a server.

A first server according to the second aspect is a server, being connected to another server that receives user information of a user, that manages the user information, wherein the server includes a transmission unit that transmits, to the another server, when storing the user information of the user, first authentication information for logging in to the server with respect to the user, and a processing unit that executes, when receiving the first authentication information, processing of reading the user information of the user.

A second server according to the second aspect is a server being connected to another server that manages user information of a user, wherein the server includes an authentication-information storage unit that acquires, from the another server, first authentication information for the server to log in to the another server with respect to the user for whom the user information is received, and stores, in a storage unit, the acquired first authentication information in association with second authentication information for the user to log in to the server, a login unit that reads, when receiving the second authentication information, the first authentication information corresponding to the second authentication information from the storage unit and logs in to the another server, and a processing unit that logs in to the another server and executes processing of storing the user information of the user in the another server.

A third aspect relates to an information processing method executed by at least one computer.

The information processing method according to the third aspect includes:

by a first server, transmitting, to a second server, when storing user information of a user in a first storage unit, first authentication information for logging in to the first server with respect to the user, and executing, when receiving the first authentication information, processing of reading the user information of the user; and by a second server, storing, in a second storage unit, second authentication information for the user to log in to the second server in association with the first authentication information, and reading, when receiving the second authentication information, the first authentication information corresponding to the second authentication information from the second storage unit, and logging in to the first server.

Note that, another aspect according to the present invention may be a program that causes at least one computer to execute the method according to the third aspect described above or may be a computer-readable storage medium that stores such a program. The storage medium includes a non-transitory, tangible medium.

The computer program includes a computer program code that causes a computer to execute, when executed by the computer, the information processing method on a first server and a second server.

Note that, any combination of the above-described components and a configuration acquired based on conversion of an expression according to the present invention among a method, an apparatus, a system, a storage medium, a computer program, and the like are also effective as an aspect according to the present invention.

Further, various types of components according to the present invention do not necessarily exist individually and independently, and in addition, a plurality of components may be formed as one member, one component may be formed with a plurality of members, a certain component may be a part of another component, and a part of a certain component and a part of another component may be overlapped.

Further, according to the method and the computer program of the present invention, a plurality of procedures are described in order, but the described order does not limit an order of executing a plurality of procedures. Therefore, when the method and the computer program according to the present invention are executed, the order of a plurality of procedures can be modified without posing an obstacle in content.

Further, a plurality of procedures of the method and the computer program according to the present invention are not limited to being executed at timings different from one another. Therefore, another procedure may occur during execution of a certain procedure, and an execution timing of a certain procedure and an execution timing of another procedure may be overlapped partially or entirely.

Advantageous Effects of Invention

According to each of the aspects described above, an information processing system, an information processing method, and a program that reduce a leakage risk of personal information can be provided.

BRIEF DESCRIPTION OF THE DRAWINGS

The above-described object, other objects, features, and advantages will become more apparent from preferred example embodiments described below and the following accompanying drawings.

FIGS. 5A to 5C are diagrams each illustrating one example of a data structure of a personal information database of an account-opening task server.

FIG. 6 is a flowchart illustrating one example of an operation of the information processing system according to the present example embodiment.

FIG. 8 is a flowchart illustrating one example of an operation of the information processing system according to the present example embodiment.

FIG. 10 is a flowchart illustrating one example of an operation of the information processing system according to the present example embodiment.

FIG. 11 is a flowchart illustrating one example of an operation of the information processing system according to the present example embodiment.

DESCRIPTION OF EMBODIMENTS

Hereinafter, example embodiments according to the present invention are described by using the accompanying drawings. Note that, in all figures, a similar component is assigned with a similar reference sign and description therefor is not repeated, as appropriate.

First Example Embodiment

Figure 1:
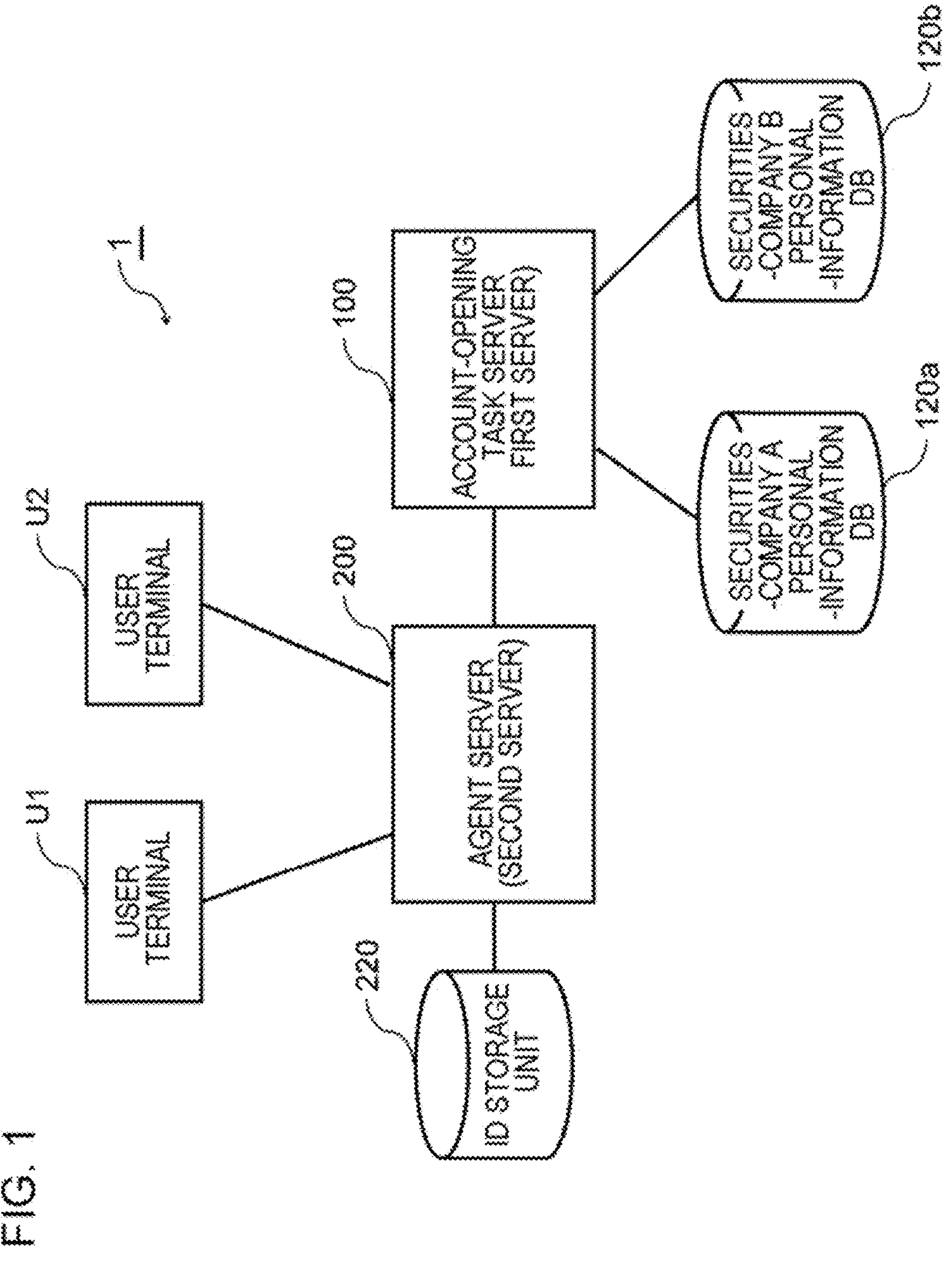
FIG. 1 is a diagram conceptually illustrating a system configuration of an information processing system according to an example embodiment of the present invention.

FIG. 1 is a diagram conceptually illustrating a system configuration of an information processing system 1 according to an example embodiment of the present invention.

The information processing system 1 includes an account-opening task server (first server) 100 and an agent server (second server) 200, and is used together with a user terminal (illustrated as U1 and U2 in the figure). In the example of the figure, two user terminals are illustrated, but the information processing system 1 may be used by at least one user terminal without limitation to two user terminals. Hereinafter, description is made, assuming that a terminal used by a user is a user terminal U1.

According to the present example embodiment, the information processing system 1 receives, according to an application from a customer (hereinafter, also referred to as a user), a task entrustment from a plurality of securities companies different from each other and performs an account-opening task. When an account of a securities company is opened, a user submits, to the securities company, identity determination information of the user necessary for opening an account, e.g. My Number (a registered trademark) (hereinafter, referred to as an "individual number"), a confirmation document (e.g. an individual number card) of an individual number, and an identity verification document (there are, for example, a driver's license, a health insurance card, and the like, and a document including the name, the address, and the birth date of a user is preferable). In addition, as identity determination information, a face photo and external appearance (a thickness of a document and another feature) information of an identity verification document can be included.

It is necessary for a user to submit, when opening an account, these documents to each of securities companies. In other words, a task relevant to identity determination and identity confirmation based on these documents is performed by each securities company every time an account is opened, which, therefore, has caused a bother to a user and a burden on a securities company.

When a user opens an account in a plurality of securities companies, the information processing system 1 according to the present example embodiment uses, in account-opening of one securities company, identity determination information and an identity verification document (hereinafter, these pieces of information are also referred to as "personal information") with which an identity confirmation procedure for identity determination information has been finished in order to open an account with another securities company. As a result, the information processing system 1 according to the present example embodiment avoids, when information is used, information relating to a user from leaking between one securities company and another securities company. Further, according to the present example embodiment, when information relating to a user is acquired and used, it is assumed that this matter is legally executed.

According to the example embodiment, "acquisition" includes at least either of a matter that an own apparatus fetches data or information stored in another apparatus or a storage medium (active acquisition) or a matter that data or information output from another apparatus is input to an own apparatus (passive acquisition). As examples of active acquisition, a matter that a request or an inquiry is issued to another apparatus and a reply thereto is received, a matter that another apparatus or a storage medium is accessed and read, and the like are cited. Further, as an example of passive acquisition, a matter that information delivered (alternatively, transmitted or pushed) is received, and the like is cited. Further, "acquisition" may be a matter that from among pieces of received data or information, a piece of data or information is selectively acquired or a matter that delivered data or information is selectively received.

The account-opening task server 100 is a server that receives an entrustment from a securities company and executes processing of opening an account. The account-opening task server 100 does not perform an exchange with the user terminal U1. The agent server 200 directly performs an exchange with a user terminal of a user, receives an application from the user, and issues, on behalf of the user, an instruction to the account-opening task server 100 for an account-opening task. In the following figures, a configuration of a portion unrelated to an essence according to the present invention is omitted and is not illustrated. For example, a system of a securities company in which the account-opening task server 100 opens an account is not illustrated. Further, according to the present example embodiment, processing itself of opening an account in a securities company executed by the account-opening task server 100 is not described.

Figure 2:
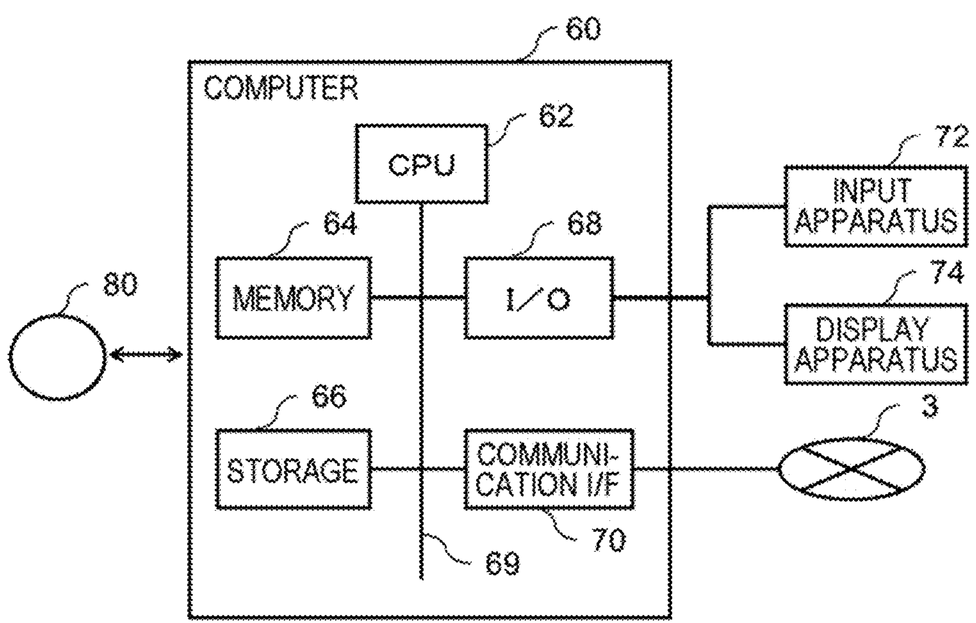
FIG. 2 is a diagram illustrating one example of a configuration of a computer that achieves each of servers and a user terminal of the information processing system according to the present example embodiment.

Each of servers of the information processing system 1 and a user terminal according to the present example embodiment are achieved by a computer. FIG. 2 is a diagram illustrating one example of a configuration of a computer 60 that achieves each of servers of the information processing system 1 and a user terminal according to the present example embodiment. The account-opening task server 100 and the agent server 200 each may be configured by using a plurality of computers 60 or may be achieved by a virtual server.

The computer 60 includes a central processing unit (CPU) 62, a memory 64, a program 80 that is loaded on the memory 64 and achieves components of servers and a user terminal, a storage 66 that stores the program 80, an input/output (I/O) 68, and an interface (communication I/F 70) for communication network connection.

The CPU 62, the memory 64, the storage 66, the I/O 68, and the communication I/F 70 are mutually connected via a bus 69, and servers and a user terminal each are controlled by the CPU 62. However, a method of mutually connecting the CPU 62 and the like is not limited to bus connection.

The memory 64 is a memory such as a random access memory (RAM) and a read only memory (ROM). The storage 66 is a storage apparatus such as a hard disk, a solid state drive (SSD), or a memory card.

The storage 66 may be a memory such as a RAM and a ROM. The storage 66 may be disposed inside the computer 60, or when the computer 60 is accessible, the storage 66 may be disposed outside the computer 60 and connected to the computer 60 wiredly or wirelessly. Alternatively, the storage 66 may be removably disposed in the computer 60.

The CPU 62 reads the program 80 stored in the storage 66 and executes the read program 80, and thereby each function of units of each server in FIG. 3 to be described below can be achieved.

The I/O 68 executes input/output control of data and a control signal between the computer 60 and another input/output apparatus. Another input/output apparatus includes, for example, an input apparatus 72 such as a keyboard, a touch panel, a mouse, and a microphone connected to the computer 60, an output apparatus such as a display (illustrated as a display apparatus 74 in the figure), a printer, and a speaker (not illustrated), and an interface between these input/output apparatuses and the computer 60. Further, the I/O 68 may execute input/output control of data for a read or write apparatus (not illustrated) of another storage medium.

The communication I/F 70 is a network connection interface for performing communication between the computer 60 and an external apparatus. The communication I/F 70 may be a network interface for connection to a wired line or may be a network interface for connection to a wireless line. For example, computers 60 each that achieve servers and a user terminal are mutually connected by the communication I/F 70 via a communication network 3.

Each of components of the information processing system 1 according to the present example embodiment in FIG. 3 to be described later is achieved by any combination of hardware and software of the computer 60 in FIG. 2. And it is understandable to a person skilled in the art that there are various modified examples with respect to an achieving method for the combination and an apparatus. A function block diagram illustrating an account-opening task server 100 and an agent server 200 according to example embodiments to be described below does not illustrate a configuration based on a hardware unit but illustrates a block based on a logical function unit.

A first computer program 80 according to the present example embodiment is described in such a way as to cause a computer 60 for achieving the account-opening task server 100 to execute a procedure of transmitting, to the agent server 200, when storing user information of a user, first authentication information for logging in to the account-opening task server 100 with respect to the user, and a procedure of executing, when receiving the first authentication information, processing of reading personal information of the user.

A second computer program 80 according to the present example embodiment is described in such a way as to cause a computer 60 for achieving the agent server 200 to execute a procedure of acquiring, from the account-opening task server 100, first authentication information for the agent server 200 to log in to the account-opening task server 100 with respect to a user for whom personal information is received, a procedure of storing, in an ID storage unit 220, the acquired first authentication information in association with second authentication information for the user to log in to the agent server 200, and a procedure of reading, when receiving the second authentication information, the first authentication information corresponding to the second authentication information from the ID storage unit 220 and logging in to the account-opening task server 100.

A computer program 80 according to the present example embodiment may be stored in a storage medium readable by the computer 60. The storage medium is not specifically limited, and storage media having various forms are conceivable. Further, the program 80 may be loaded onto the memory 64 of the computer 60 from a storage medium, or may be downloaded onto the computer 60 through a network and loaded onto the memory 64.

A storage medium that stores a computer program 80 includes a non-transitory; tangible medium usable by the computer 60, and a program code readable by the computer 60 is embedded in the medium. The computer program 80 causes, when being executed on the computer 60, the computer 60 to execute an information processing method of achieving the account-opening task server 100 or the agent server 200.

Further, the user terminal U1 is a terminal apparatus used by a user and is, for example, a personal computer, a tablet terminal, a smartphone, a mobile phone, or the like. The user terminal U1 may be a possession of a user or a thing rented to a user. Forms in which a user uses, by using the user terminal U1, a service of the information processing system 1 are exemplified below; but are not limited to these forms.

(1) An application is installed in the user terminal U1 and initiated, the agent server 200 is accessed based on the application, and the user terminal U1 uses a service provided by the information processing system 1.

(2) A browser is initiated on the user terminal U1, a predetermined website is accessed, and the user terminal U1 uses a service provided by the information processing system 1.

(3) By use of so-called Software as a Service (Saas), an application for achieving the information processing system 1 is executed on the agent server 200, and the user terminal U1 uses a service provided by the information processing system 1 online via a communication network.

Further, while a connection form between the agent server 200 and the user terminal U1 is not specifically limited, it is assumed that connection is established based on a form security of which is ensured. While a connection form between the account-opening task server 100 and the agent server 200 is not limited either, connection is established based on a form security of which is ensured and preferably, connection is established, for example, based on a dedicated line. Apparatuses are connected in at least either of a wired manner or a wireless manner. A communication method is not limited either, and each of apparatuses may be mutually connected based on an available communication method.

When the present information processing system 1 is used, a user previously makes an application for use. The application for use includes an application for use made at the same time as an account application to a securities company being a first company. At a time of an application for use, user registration information, being information for example, such as a name, an address, and a phone number, is registered and an issuance of authentication information (a user ID and a password) is received. The application for use is made to the agent server 200. For example, by using the user terminal U1, it may be possible that a website that receives an application for use is accessed and thereby an application is made: by using a terminal apparatus (not illustrated) of the agent server 200, it may be possible that the information processing system 1 is accessed and thereby an application is made; and by using the user terminal U1 or a terminal apparatus of the agent server 200, it may be possible that a dedicated application is initiated and thereby an application is made on an application screen.

Figure 3:
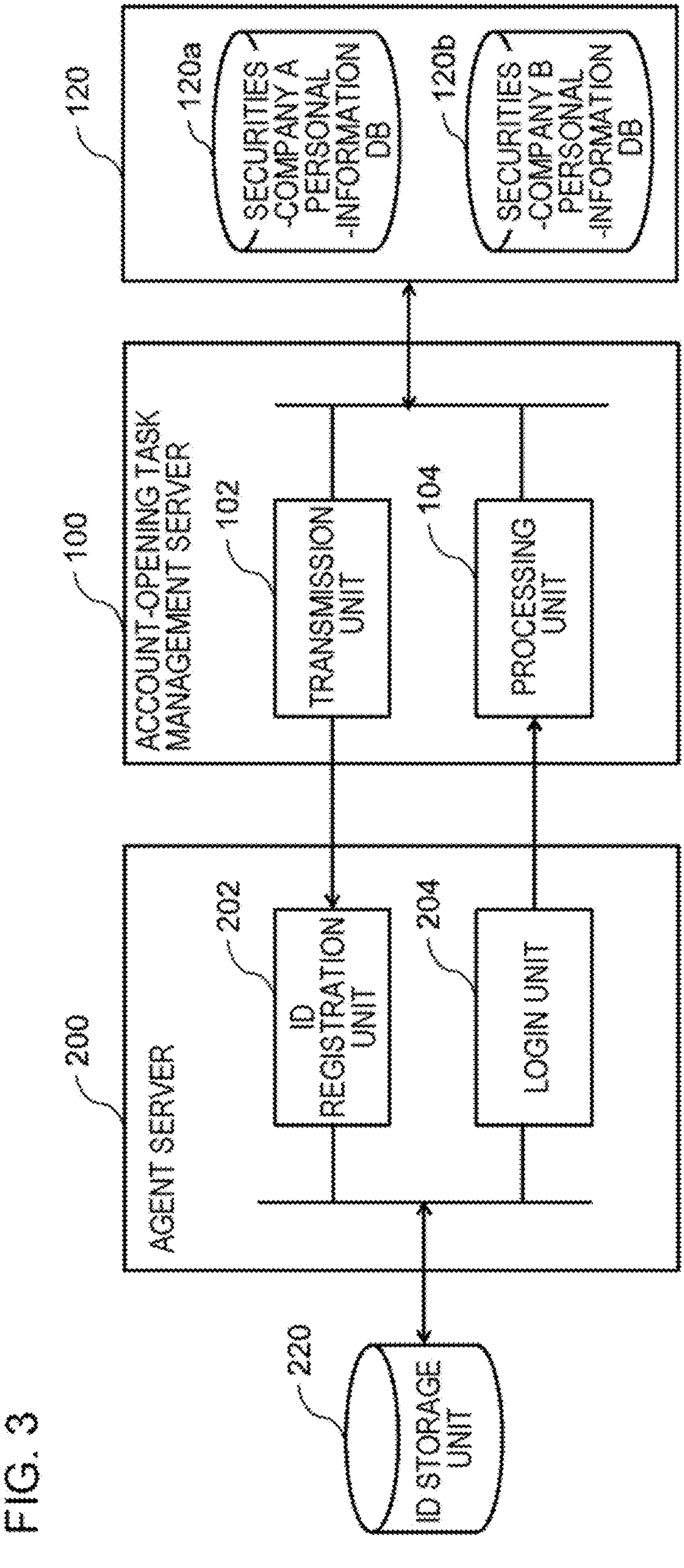
FIG. 3 is a function block diagram logically illustrating a configuration of each of servers of an information processing system according to the example embodiment of the present invention.

FIG. 3 is a function block diagram logically illustrating a configuration of each of servers of the information processing system 1 according to the example embodiment of the present invention.

The account-opening task server 100 includes a transmission unit 102 and a processing unit 104. The agent server 200 includes an ID registration unit (authentication-information storage unit) 202 and a login unit 204.

The transmission unit 102 transmits, to the agent server 200, when storing personal information of a user in a personal information database 120 (first storage unit), first authentication information (a user ID1 and a password P1) for logging in to the account-opening task server 100 with respect to the user. In other words, the first authentication information is information for the agent server 200 to log in to the account-opening task server 100 instead of a user.

The processing unit 104 executes, when receiving the first authentication information, processing of reading the personal information of a user. Processing of reading personal information includes pieces of processing as described below:

(1) Processing of confirming authorization of a right of representation for the agent server 200 with respect to a user (2) Processing of confirming whether personal information of a user is already identity-confirmed (i.e., whether to be legitimate)

(3) Processing of issuing a request for providing, to a securities company B, identity-confirmed personal information of a user stored in a securities-company A personal-information database 120*a*.

(4) Processing of storing, in a securities-company B personal-information database 120*b*, personal information of a user read from the securities-company A personal-information database 120*a*

Details of these pieces of processing are described according to example embodiments to be described later.

The ID registration unit 202 stores, in the ID storage unit 220 (a second storage unit), second authentication information (a user ID2 and a password P2) for a user to log in to the agent server 200, in association with first authentication information (a user ID1 and a password P1).

The login unit 204 reads, when receiving second authentication information (a user ID2 and a password P2) from the user terminal U1, first authentication information (a user ID1 and a password P1) corresponding to the second authentication information (the user ID2 and the password P2) from the ID storage unit 220, and logs in to the account-opening task server 100.

Figure 4A:
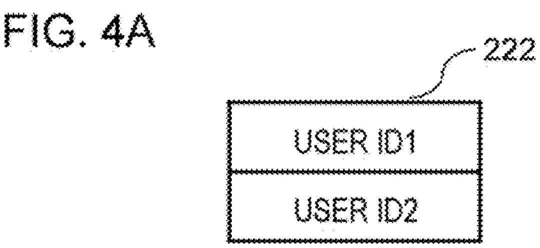
FIGS. 4A to 4C are diagrams each illustrating one example of a data structure of an ID storage unit of an agent server.
Figure 4B:
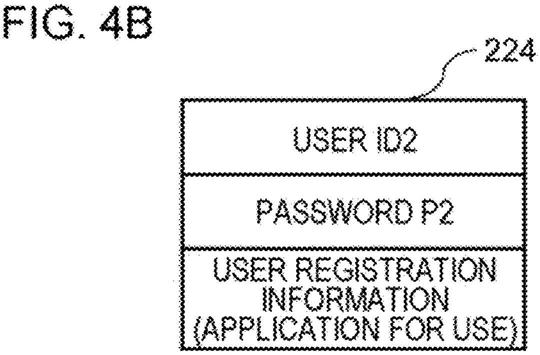
Figure 4C:
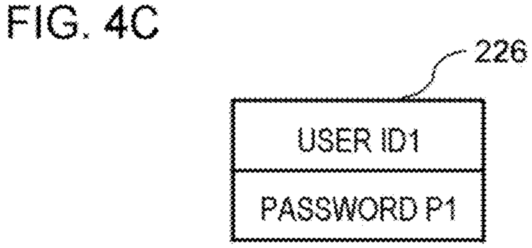

FIGS. 4A to 4C are diagrams each illustrating one example of a data structure of the ID storage unit 220 of the agent server 200. The ID storage unit 220 may be accessibly connected to the agent serve 200 and included in the agent server 200, or may be a storage apparatus disposed outside the agent server 200. The ID storage unit 220 stores pieces of information illustrated in FIGS. 4A to 4C.

As illustrated in FIG. 4A, second authentication information (a user ID2 and a password P2) is stored by the ID registration unit 202 in ID information 222 of the ID storage unit 220 in association with first authentication information (a user ID1 and a password P1).

As illustrated in FIG. 4B, when making an application for use of the system, a user may store, in the ID storage unit 220, user registration information 224, e.g., information such as a name, an address, and a phone number in association with second authentication information (a user ID2 and a password P2). As illustrated in FIG. 4C, first authentication information 226 (a user ID1 and a password P1) issued from the account-opening task server 100 may be stored in the ID storage unit 220.

FIGS. 5A to 5C are diagrams each illustrating one example of a data structure of the personal information database 120 of the account-opening task server 100. The personal information database 120 may be accessibly connected to the account-opening task server 100 and included in the account-opening task server 100, or may be a storage apparatus disposed outside the account-opening task server 100. Note that, the personal information database 120 may not necessarily be based on a database format. The personal information database 120 stores pieces of information illustrated in FIGS. 5A to 5C.

As illustrated in FIG. 5A, the personal information database 120 stores first authentication information (a user ID1 and a password P1) issued by the transmission unit 102.

As illustrated in FIG. 5B, the personal information database 120 may store, in association with a user ID, information (confirmed information 124) indicating that identity determination information of the user is already confirmed. As illustrated in FIG. 5C, the personal information database 120 may store, in association with a user ID, personal information 126 (an individual number, an individual-number confirmation document, and an identity verification document) of a user. Note that, a confirmation document of personal information is stored as digitized data.

The personal information database 120 includes, as illustrated in FIG. 1 or FIG. 3, a first storage area (a securities-company A personal-information database 120*a*) and a second storage area (a securities-company B personal-information database 120*b*) different for each securities company. The first storage area (the securities-company A personal-information database 120*a*) is accessible by a system (not illustrated) of the securities company A, and is not accessible by a system (not illustrated) of a securities company other than the securities company A. The second storage area (the securities-company B personal-information database 120*b*) is accessible by a system (not illustrated) of the securities company B, and is not accessible by a system (not illustrated) of a securities company other than the securities company B.

The first storage area (the securities-company A personal-information database 120*a*) and the second storage area (the securities-company B personal-information database 120*b*) may be areas that are included in the physically same storage apparatus and are logically divided, or may be provided in two different storage apparatuses physically separated.

An operation of the information processing system 1 according to the present example embodiment configured in this manner is described.

FIG. 6 is a flowchart illustrating one example of an operation of the information processing system 1 according to the present example embodiment.

First, in order to open an account in a securities company A, a user logs in to the agent server 200 from the user terminal U1 by using a user ID2 and a password P2 previously acquired (step S101). Before or after login, the user may specify, on an operation screen displayed in the user terminal U1, a task content (account-opening or the like) to be representatively executed and a target business operator (e.g., a securities company name, a branch name, and the like).

The agent server 200 receives, from the user terminal U1, the user ID2 and the password P2 and executes authentication processing of whether to be a user of the present system (step S103). After the authentication, the agent server 200 makes, as an agent of the user, an account-opening application for the securities company A to the account-opening task server 100 (step S105).

The transmission unit 102 of the account-opening task server 100 transmits, to the agent server 200, first authentication information (a user ID1 and a password P1) for logging in to the account-opening task server 100 necessary for storing and reading personal information of the user (step S107). At that time, the transmission unit 102 stores the first authentication information (the user ID1 and the password P1) of the user in the personal information database 120 (FIG. 5A).

The ID registration unit 202 of the agent server 200 stores, when receiving the first authentication information (the user ID1 and the password P1) from the account-opening task server 100, the second authentication information (the user ID2 and the password P2) of the user and the first authentication information (the user ID1 and the password P1) in the ID storage unit 220 in association with each other (step S109).

Then, the login unit 204 of the agent server 200 requests, from the user terminal U1, personal information (an individual number, an individual-number confirmation document, and an identity verification document) necessary for opening an account (step S111). Then, the login unit 204 of the agent server 200 logs in, when receiving personal information transmitted from the user terminal U1 (step S113), to the account-opening task server 100 by using the first authentication information (the user ID1 and the password P1) of the user (step S115). The user terminal U1 is being logged in by the user ID2 when personal information is transmitted from the user terminal U1 in step S111, and therefore first authentication information of a user can be acquired by reading, from the ID storage unit 220, a user ID1 corresponding to the user ID2 during login.

The processing unit 104 of the account-opening task server 100 executes, when receiving the user ID1 and the password P1 of the user from the agent server 200, authentication processing (step S117). The processing unit 104 executes authentication processing by executing collation with first authentication information (FIG. 5A) stored in the personal information database 120.

Then, after the authentication, the processing unit 104 requests personal information from the agent server 200 (step S119), and receives the personal information transmitted from the agent server 200 to the account-opening task server 100 (step S121). The processing unit 104 stores the received personal information in the personal information database 120 in association with discrimination information (e.g., the user ID1) of the user (step S123).

As described above, according to the present example embodiment, when an account-opening request from a user is received by the agent server 200, account-opening is requested to the account-opening task server 100, first authentication information (a user ID1 and a password P1) for logging in to the account-opening task server 100 is issued by the transmission unit 102 of the account-opening task server 100, and the first authentication information is registered by the ID registration unit 202 of the agent server 200 in the personal information database 120 in association with second authentication information (a user ID2 and a password P2) for a user to log in to the agent server 200. Then, when personal information is stored based on an account-opening request of a user in the personal information database 120, the agent server 200 can log in to the account-opening task server 100 by acquiring the first authentication information corresponding to the second authentication information of the user, and execute processing of storing the personal information of the user in the personal information database 120.

In this manner, according to the present example embodiment, the agent server 200 causes the account-opening task server 100 to execute processing of reading user information instead of a user, and therefore, an advantageous effect of reducing a leakage risk of personal information is exerted.

Second Example Embodiment

Figure 7:
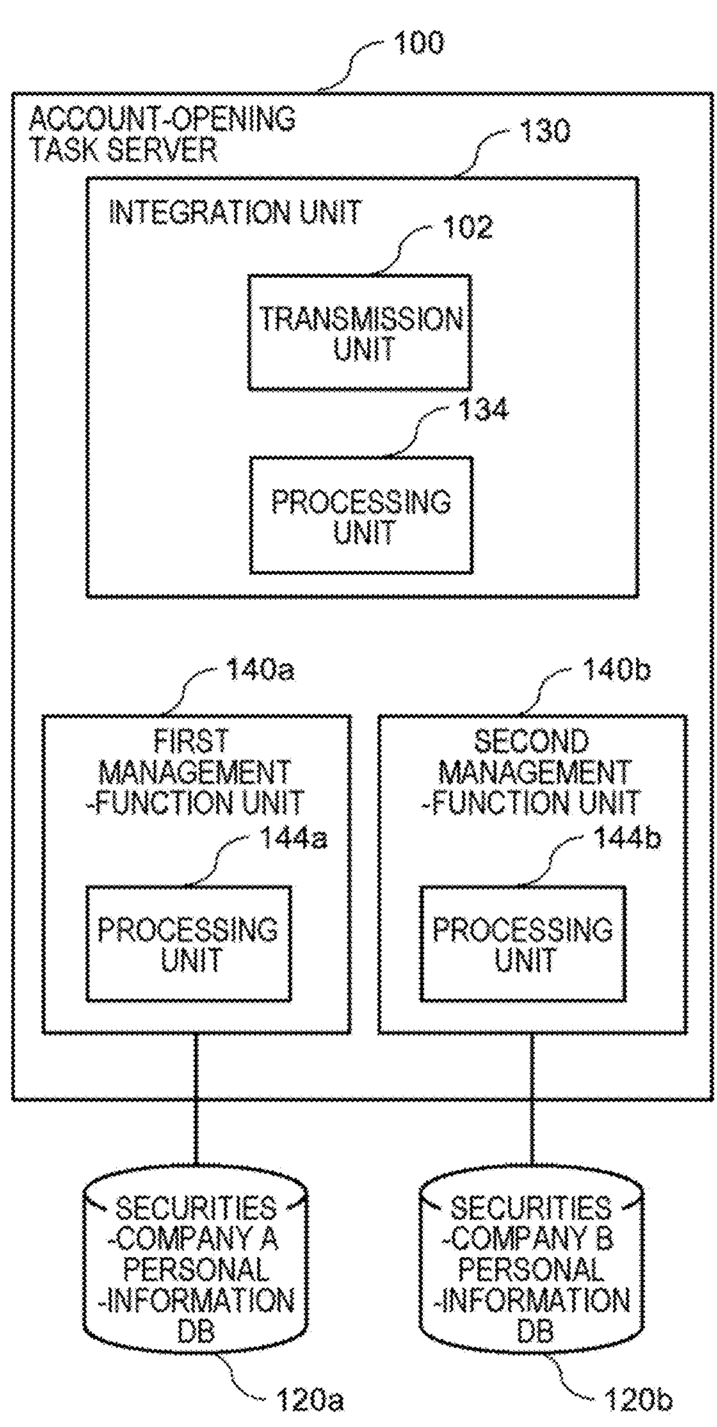
FIG. 7 is a function block diagram illustrating a logical configuration of an account-opening task server according to the present example embodiment.

FIG. 7 is a function block diagram illustrating a logical configuration of an account-opening task server 100 according to the present example embodiment. The account-opening task server 100 is similar to the example embodiment described above except that a management function unit is included for each securities company. The account-opening task server 100 includes an integration unit 130 that integrates tasks of a plurality of securities companies, a first management-function unit 140*a* (hereinafter, also referred to as a securities-company A management-function unit 140*a*) that executes a task of a securities company A, and a second management-function unit 140*b* (hereinafter, also referred to as a securities-company B management-function unit 140*b*) that executes a task of a securities company B.

The first management-function unit 140*a* manages a securities-company A personal-information database 120*a*. The second management-function unit 140*b* manages a securities-company B personal-information database 120*b*. In this manner, the first management-function unit 140*a* and the second management-function unit 140*b* are associated with business operators different from each other. According to the present example embodiment, a business operator is, but not limited to, a securities company.

The integration unit 130, the first management-function unit 140*a*, and the second management-function unit 140*b* according to the present example embodiment include a processing unit 134, a processing unit 144*a*, and a processing unit 144*b*, respectively, that achieve, based on each share, a function of the processing unit 104 described in FIG. 3. Further, the integration unit 130 includes a transmission unit 102 as described in FIG. 3.

An operation of an information processing system 1 according to the present example embodiment configured in this manner is described below. FIG. 8 is a flowchart illustrating one example of an operation of the information processing system 1 according to the present example embodiment. FIG. 8 illustrates procedures of performing a procedure when a user uses the present information processing system 1 for a first time.

The flowchart in FIG. 8 includes steps S101 to S123 being the same as in FIG. 6 and further includes steps S201 to S203. Further, the flowchart in FIG. 6 and the flowchart in FIG. 8 are the same except that among the procedures of the account-opening task server 100 in FIG. 6, step S107 is executed by the integration unit 130, and step S117, step S119, and step S123 are executed by the securities-company A management-function unit 140*a*.

First, a user makes, by using a user terminal U1, an application for use of the present information processing system 1 (step S201). Specifically, an agent server 200 receives, from the user terminal U1, user registration information (e.g., information such as a name, an address, and a phone number). The agent server 200 issues, when receiving the application for use from the user terminal U1, second authentication information (a user ID2 and a password P2) and transmits the issued second authentication information to the user terminal U1 (step S203). Then, in order to open an account in a securities company A, the user logs in to the agent server 200 from the user terminal U1 by using the user ID2 and the password P2 acquired in step S203 (step S101).

The agent server 200 receives, from the user terminal U1, the user ID2 and the password P2 and executes authentication processing of whether to be a user of the present system (step S103). After the authentication, the agent server 200 makes, as an agent for the user, an account-opening application for the securities company A to the integration unit 130 of the account-opening task server 100 (step S105).

Then, the transmission unit 102 of the integration unit 130 in the account-opening task server 100 transmits, to the agent server 200, first authentication information (a user ID1 and a password P1) for logging in to the securities-company A management-function unit 140*a* of the account-opening task server 100 necessary for storing and reading personal information of the user (step S107). At that time, the transmission unit 102 of the integration unit 130 stores the first authentication information (the user ID1 and the password P1) of the user in the securities-company A personal-information database 120*a* (FIG. 5A).

An ID registration unit 202 of the agent server 200 stores, when receiving the first authentication information (the user ID1 and the password P1) from the account-opening task server 100, the second authentication information (the user ID2 and the password P2) of the user and the first authentication information (the user ID1 and the password P1) in an ID storage unit 220 in association with each other (step S109)

Then, a login unit 204 of the agent server 200 requests, from the user terminal U1, personal information (an individual number, an individual-number confirmation document, and an identity verification document) necessary for opening an account (step S111). Then, the login unit 204 of the agent server 200 logs in, when receiving personal information transmitted from the user terminal U1 (step S113), to the securities-company A management-function unit 140*a* of the account-opening task server 100 by using the first authentication information (the user ID1 and the password P1) of the user (step S115). The user terminal U1 is being logged in with the user ID2 when personal information is transmitted from the user terminal U1 in step S111, and therefore first authentication information of a user can be acquired by reading, from the ID storage unit 220, a user ID1 corresponding to the user ID2 during login.

The processing unit 144*a* of the securities-company A management-function unit 140*a* in the account-opening task server 100 executes, when receiving the user ID1 and the password P1 of the user from the agent server 200, authentication processing (step S117). The processing unit 144*a* executes authentication processing by executing collation with first authentication information (FIG. 5A) stored in the securities-company A personal-information database 120*a*.

Then, after the authentication, the processing unit 144*a* requests personal information from the agent server 200 (step S119), and receives the personal information transmitted from the agent server 200 to the securities-company A management-function unit 140*a* of the account-opening task server 100 (step S121). The processing unit 144*a* stores the received personal information in the securities-company A personal-information database 120*a* in association with discrimination information (e.g., the user ID1) of the user (step S123).

As described above, according to the present example embodiment, processing, which causes the securities-company B management-function unit 140*b* and the securities-company A management-function unit 140*a* to execute processing of storing, in the securities-company B personal information-database 120*b*, personal information stored in the securities-company A personal-information database 120*a*, is executed by the integration unit 130 in response to an account-opening request from a user.

According to the configuration, an advantageous effect similar to the example embodiment described above is exerted, and further, the securities-company B management-function unit 140*b* and the securities-company A management-function unit 140*a* perform an exchange via the agent server 200, and therefore the first management-function unit 140*a* and the second management-function unit 140*b* can prevent leakage of information relating to account-opening of a user, without recognizing from what securities-company personal-information database 120 information relating to a user has been read.

Third Example Embodiment

Figure 9:
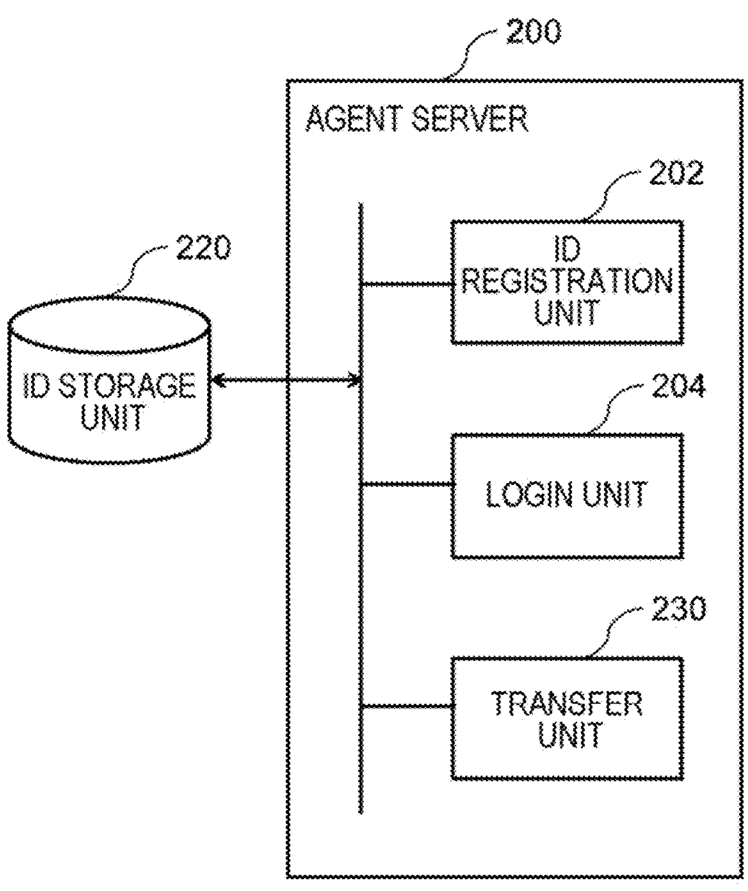
FIG. 9 is a function block diagram illustrating a logical configuration of an agent server according to the present example embodiment.

FIG. 9 is a function block diagram illustrating a logical configuration of an agent server 200 according to the present example embodiment. The agent server 200 according to the present example embodiment is similar to the example embodiments described above except that a configuration in which personal information of a user being identity-confirmed at a time of account-opening in one securities company can be securely used in another securities company at a time of account-opening in the another securities company is included.

The agent server 200 further includes a transfer unit 230, in addition to the configuration of the agent server 200 according to the example embodiment in FIG. 3. Further, it is assumed that an account-opening task server 100 includes the configuration in FIG. 7.

A processing unit 144*a* of a first management-function unit 140*a* in the account-opening task server 100 transmits, to the agent server 200, when receiving first authentication information, permission information (hereinafter, also referred to as a token) for access to user information of a user stored in a securities-company A personal-information database 120*a*.

The transfer unit 230 of the agent server 200 transfers, when receiving a token, the received token to an integration unit 130.

A processing unit 134 of the integration unit 130 acquires, based on the token received from the agent server 200, personal information of a user stored in the securities-company A personal-information database 120*a*, and stores the acquired personal information in a securities-company B personal-information database 120*b*.

Herein, the integration unit 130 acquires, based on a token, a right of access to personal information of a user stored in the securities-company A personal-information database 120*a*. This indicates that a securities-company B management-function unit 140*b* is prohibited from directly accessing personal information stored in the securities-company A personal-information database 120*a* different from that of the securities company B, and therefore, the integration unit 130 receives personal information from the securities company A and transfers the received personal information to the securities company B. The securities-company B management-function unit 140*b* can acquire, via the integration unit 130, personal information stored in the securities-company A personal-information database 120*a* and store the acquired personal information in the securities-company B personal-information database 120*b*.

Further, personal information submitted from a user at a time of account-opening in the securities company A is stored in the securities-company A personal-information database 120*a*. Personal information used at a time of account-opening in the securities company B is stored in the securities-company B personal-information database 120*b*.

The processing unit 144*a* of the securities-company A management-function unit 140*a* reads, when receiving, after receiving an account-opening application to the securities company A from a user terminal U1 and storing personal information in the personal information database 120*a*, an account-opening application to the securities company B, personal information of a user from the personal information database 120*a* and stores the read personal information in the personal information database 120*b*. As described above, the processing is executed via the integration unit 130.

A procedure of making an account-opening procedure for another securities company after an account-opening procedure for a securities company A is made based on a first procedure in the flowchart of FIG. 8 according to the example embodiment described above is described. FIG. 10 and FIG. 11 each are a flowchart illustrating one example of an operation of an information processing system 1 according to the present example embodiment.

First, in order to open an account in a securities company B, a user logs in to the agent server 200 from the user terminal U1 by using a user ID2 and a password P2 previously acquired (step S301).

The agent server 200 receives the user ID2 and the password P2 from the user terminal U1, and executes authentication processing of whether to be a user of the present system (step S303). After the authentication, a login unit 204 of the agent server 200 reads, from an ID storage unit 220, first authentication information (a user ID1 and a password P1) necessary for making an account-opening application for the securities company B as an agent of the user to the integration unit 130 of the account-opening task server 100 (step S305). From ID information 222 in FIG. 4A, the user ID1 corresponding to the user ID2 is acquired, and also, from first authentication information 226 in FIG. 4C, a password P1 corresponding to the user ID1 is read and acquired.

Then, the login unit 204 of the agent server 200 logs in, by using the read first authentication information 226 (the user ID1 and the password P1), to the integration unit 130 of the account-opening task server 100 in order to make an account-opening application to the securities company B (step S307). Before or after login, a user may specify, on an operation screen displayed in the user terminal U1, a task content (account-opening or the like) to be representatively executed and a target business operator (e.g., a securities company name, a branch name, and the like).

The processing unit 134 of the integration unit 130 in the account-opening task server 100 executes, when receiving first authentication information, authentication processing (step S309). The processing unit 134 executes authentication processing by executing collation with first authentication information 122 (FIG. 5A) stored in the personal information database 120*a*.

Then, after the authentication, the processing unit 134 instructs the securities-company B management-function unit 140*b* to execute processing of using, for an account-opening task in the securities company B, identity-confirmed personal information relating to a user stored in the securities-company A personal-information database 120*a* (step S311). At that time, the processing unit 134 refers to confirmed information 124 in FIG. 5B, and thereby can confirm that personal information of the user ID1 has been already submitted.

Next, by moving to FIG. 11, a processing unit 144*b* of the securities-company B management-function unit 140*b* receives an instruction from the integration unit 130, and requests identity-confirmed personal information relating to a user from the agent server 200 (step S313). At that time, for details, the processing unit 144*b* of the securities-company B management-function unit 140*b* confirms, with the agent server 200, whether a right of representation for a user has been already authorized, receives certification for the provided authorization from the agent server 200, and thereafter requests personal information from the agent server 200.

The transfer unit 230 of the agent server 200 requests a return of identity-confirmed personal information of a user stored in the securities-company A personal-information database 120*a* from the securities-company A management-function unit 140*a* (step S315).

The processing unit 144*a* of the securities-company A management-function unit 140*a* issues a token including permission information for access to identity-confirmed personal information of a user stored in the securities-company A personal-information database 120*a* (step S317). The token includes information (e.g., the user ID1) capable of determining a user. Further, the information capable of determining a user may be ciphered. Further, in the token, a transfer destination is specified in such a way as to be circulated, via the agent server 200, from the securities-company A management-function unit 140*a* to the securities-company B management-function unit 140*b*.

Then, the transfer unit 230 of the agent server 200 receives a token and transfers the received token to the integration unit 130 (step S319). The processing unit 134 of the integration unit 130 confirms validity of the received token (step S321). As a method of confirming validity of a token, for example, an expiration date, an electronic signature, and the like are conceivable.

The processing unit 134 issues, to the securities-company A management-function unit 140*a*, by using the user ID1 acquired together with the token, a request for accessing personal information of a user determined from the user ID1 and stored in the securities-company A personal-information database 120*a* (step S323). The processing unit 144*a* of the securities-company A management-function unit 140*a* reads personal information of a user determined from the user ID1 from the personal information database 120*a*, and transmits the read personal information to the integration unit 130 (step S325). Then, the processing unit 134 of the integration unit 130 transfers the personal information received from the securities-company A management-function unit 140*a* to the securities-company B management-function unit 140*b* (step S327). Then, the processing unit 144*b* of the securities-company B management-function unit 140*b* receives the personal information from the integration unit 130, and stores the received personal information in the securities-company B personal-information database 120*b* (step S329). Then, the processing unit 144*b* of the securities company B management-function unit 140*b* reports, to the integration unit 130, a fact that the personal information of the user has been stored (step S331).

As described above, according to the present example embodiment, a token issued by the processing unit 144*a* of the first management-function unit 140*a* is transferred to the second management function unit 140*b* via the agent server 200, a request to the first management-function unit 140*a* for returning personal information of a user is issued, based on the token, by the processing unit 144*b* of the second management-function unit 140*b*, and personal information of a user stored in the personal information database 120*a* is stored by the processing unit 144*a* in the personal information database 120*b*.

According to the configuration, an advantageous effect similar to the example embodiments described above is exerted and further, the securities-company B management-function unit 140*b* and the securities-company A management-function unit 140*a* perform an exchange via the agent server 200, and in addition, personal information is stored, via the integration unit 130, in the securities-company B personal-information database 120*b* from the securities-company A personal-information database 120*a*, and therefore the first management-function unit 140*a* and the second management-function unit 140*b* can prevent leakage of information relating to account-opening of a user, without recognizing from what securities-company personal-information database 120 information relating to a user has been read.

While example embodiments of the present invention have been described with reference to the drawings, these example embodiments are only illustrative of the present invention, and various configurations other than the above-described configurations can also be employed.

For example, the agent server 200 may further include a storage processing unit (not illustrated) that stores permission information (a token) for access in a storage unit (not illustrated) in association with at least either one of first authentication information and second authentication information. The storage unit may be a storage apparatus physically the same as the ID storage unit 220 according to the example embodiments described above. In this manner, a token issuance history can be stored in the storage unit. Further, in the account-opening task server 100, a history may be stored similarly in a similar storage unit (not illustrated).

While the invention has been particularly shown and described with reference to example embodiments and examples thereof, the invention is not limited to these example embodiments and examples. It will be understood by a person skilled in the art that various changes in form and details may be made therein without departing from the spirit and scope of the present invention as defined by the claims.

The whole or part of the example embodiments described above can be described as, but not limited to, the following supplementary notes.

1. An information processing system including a first server and a second server, wherein
   the first server includes
   a transmission unit that transmits, to the second server, when storing user information of a user in a first storage unit, first authentication information for logging in to the first server with respect to the user, and
   a processing unit that executes, when receiving the first authentication information, processing of reading the user information of the user, and
   the second server includes
   an authentication-information storage unit that stores, in a second storage unit, second authentication information for the user to log in to the second server in association with the first authentication information, and
   a login unit that reads, when receiving the second authentication information, the first authentication information corresponding to the second authentication information from the second storage unit and logs in to the first server.
2. The information processing system according to supplementary note 1, wherein
   the first storage unit includes a first storage area and a second storage area, and
   the processing unit of the first server executes, when receiving the first authentication information, processing of reading the user information of the user stored in the first storage area and storing the read user information in the second storage area.
3. The information processing system according to supplementary note 2, wherein
   the first server includes
   a first management-function unit that manages the first storage area, and
   a second management-function unit that manages the second storage area, and
   the first management-function unit and the second management-function unit are associated with business operators different from each other.
4. The information processing system according to supplementary note 3, wherein
   the first management-function unit of the first server transmits, to the second server, when receiving the first authentication information, permission information for access to the user information of the user stored in the first storage area,
   the second server further includes
   a transfer unit that transfers, when receiving the permission information for access, the received permission information for access to the second management-function unit, and
   the second management-function unit of the first server acquires, based on the permission information for access received from the second server, the user information of the user stored in the first storage area, and stores the acquired user information in the second storage area.
5. The information processing system according to supplementary note 3 or 4, wherein
   the business operator is a securities company,
   the user information submitted from the user at a time of account-opening in a first securities company is stored in the first storage area,
   the user information used at a time of account-opening in a second securities company is stored in the second storage area, and
   the processing unit reads, when receiving, after receiving an account-opening application for the first securities company from a user terminal and storing the user information in the first storage area, an account-opening application for the second securities company, the user information of the user from the first storage area, and stores the read user information in the second storage area.
6. The information processing system according to supplementary note 4 or supplementary note 5 citing supplementary note 4, wherein
   the second server includes
   a storage processing unit that stores the permission information for access in a third storage unit in association with at least either one of the first authentication information and the second authentication information.
7. The information processing system according to any one of supplementary notes 1 to 6, wherein
   the user information includes identity determination information, a confirmation document of the identity determination information, and information relating to an identity verification document, and
   the first storage unit stores the identity-confirmed user information.
8. A server being connected to a management server that manages user information of a user, the server including:
   an authentication information storage unit that acquires, from the management server, first authentication information for the server to log in to the management server with respect to the user for whom the user information is received, and stores, in a storage unit, the acquired first authentication information in association with second authentication information for the user to log in to the server:
   a login unit that reads, when receiving the second authentication information, the first authentication information corresponding to the second authentication information from the storage unit and logs in to the management server; and
   a processing unit that logs in to the management server and executes processing of storing user information of the user in the management server.
9. The server according to supplementary note 8, further including
   a storage unit that stores the user information of the user and includes a first storage area and a second storage area, wherein,
   when the management server is logged in by the login unit by using the first authentication information,
   the processing unit executes processing of reading the user information of the user stored in the first storage area onto the management server, and storing the read user information in the second storage area.
10. The server according to supplementary note 9, wherein
   a first management-function unit that manages the first storage area and a second management-function unit that manages the second storage area both included in the management server are associated with business operators different from each other, and
   the processing unit
   transfers, when receiving permission information for access to the user information of the user stored in the first storage area, the received permission information for access to the second management-function unit of the management server, and causes the second management-function unit of the management server to acquire, based on the received permission information for access, the user information of the user stored in the first storage area and store the acquired user information in the second storage area.

11. The server according to supplementary note 10, wherein the business operator is a securities company, the user information submitted from the user at a time of account-opening in a first securities company is stored in the first storage area, the user information used at a time of account-opening in a second securities company is stored in the second storage area, and the processing unit reads, when receiving, after receiving an account-opening application for the first securities company from a user terminal and storing the user information in the first storage area, an account-opening application for the second securities company, the user information of the user from the first storage area, and stores the read user information in the second storage area.

12. The server according to supplementary note 10 or 11, further including a storage processing unit that stores the permission information for access in a storage unit in association with at least either one of the first authentication information and the second authentication information.

13. The server according to any one of supplementary notes 9 to 12, wherein the user information includes identity determination information, a confirmation document of the identity determination information, and information relating to an identity verification document, and the storage unit stores the identity-confirmed user information.

14. A management server, being connected to another server that receives user information of a user, that manages the user information, the management server including:

a transmission unit that transmits, to the another server, when storing the user information of the user, first authentication information for logging in to the management server with respect to the user; and a processing unit that executes, when receiving the first authentication information, processing of reading the user information of the user.

15. The management server according to supplementary note 14, further including a storage unit that stores the user information of the user and includes a first storage area and a second storage area, wherein the processing unit executes, when receiving the first authentication information, processing of reading the user information of the user stored in the first storage area and storing the read user information in the second storage area.

16. The management server according to supplementary note 15, further including:

a first management-function unit that manages the first storage area; and a second management-function unit that manages the second storage area, wherein the first management-function unit and the second management-function unit are associated with business operators different from each other.

17. The management server according to supplementary note 16, wherein the first management-function unit transmits, to the another server, when receiving the first authentication information, permission information for access to the user information of the user stored in the first storage area, and the second management-function unit acquires, based on the permission information for access transferred from the another server, the user information of the user stored in the first storage area and stores the acquired user information in the second storage area.

18. The management server according to supplementary note 16 or 17, wherein the business operator is a securities company, the user information submitted from the user at a time of account-opening in a first securities company is stored in the first storage area, the user information used at a time of account-opening in a second securities company is stored in the second storage area, and the processing unit reads, when receiving, after receiving an account-opening application for the first securities company from a user terminal and storing the user information in the first storage area, an account-opening application for the second securities company, the user information of the user from the first storage area, and stores the read user information in the second storage area.

19. The management server according to any one of supplementary notes 15 to 18, wherein the user information includes identity determination information, a confirmation document of the identity determination information, and information relating to an identity verification document, and the storage unit stores the identity-confirmed user information.

20 An information processing method including:

by a first server, transmitting, to a second server, when storing user information of a user in a first storage unit, first authentication information for logging in to the first server with respect to the user and executing, when receiving the first authentication information, processing of reading the user information of the user; and by a second server, storing, in a second storage unit, second authentication information for the user to log in to the second server in association with the first authentication information, and reading, when receiving the second authentication information, the first authentication information corresponding to the second authentication information from the second storage unit, and logging in to the first server.

21. The information processing method according to supplementary note 20, wherein the first storage unit includes a first storage area and a second storage area, the method including, by the first server, executing, when receiving the first authentication information, processing of reading the user information of the user stored in the first storage area and storing the read user information in the second storage area.

22. The information processing method according to supplementary note 21, wherein the first storage area and the second storage area are associated with business operators different from each other, and the method comprises, by the first server, managing the first storage area and the second storage area independently of each other.

23. The information processing method according to supplementary note 22, further including:

by the first server, transmitting, to the second server, when receiving the first authentication information, permission information for access to the user information of the user stored in the first storage area:

by the second server, transferring, when receiving the permission information for access, the received permission information for access to the first server; and by the first server, acquiring, based on the permission information for access received from the second server, the user information of the user stored in the first storage area, and storing the acquired user information in the second storage area.

24. The information processing method according to supplementary note 22 or 23, wherein the business operator is a securities company, the user information submitted from the user at a time of account-opening in a first securities company is stored in the first storage area:

the user information used at a time of account-opening in a second securities company is stored in the second storage area; and the method further includes, by the first server, reading, when receiving, after receiving an account-opening application for the first securities company from a user terminal and storing the user information in the first storage area, an account-opening application for the second securities company, the user information of the user from the first storage area, and storing the read user information in the second storage area.

25. The information processing method according to supplementary note 23 or supplementary note 24 citing supplementary note 23, the method further including, by the second server, storing the permission information for access in a third storage unit in association with at least either one of the first authentication information and the second authentication information.

26. The information processing method according to any one of supplementary notes 20 to 25, wherein the user information includes identity determination information, a confirmation document of the identity determination information, and information relating to an identity verification document, the method further includes, by the first storage unit, storing the identity-confirmed user information.

27. A program causing a computer connected to another computer that manages user information of a user to execute:

a procedure of acquiring, from the another computer, first authentication information for the computer to log in to the another computer with respect to the user for whom the user information is received:

a procedure of storing, in a storage unit, the acquired first authentication information in association with second authentication information for the user to log in to the computer:

a procedure of reading, when receiving the second authentication information, the first authentication information corresponding to the second authentication information from the storage unit and logging in to the another computer; and a procedure of logging in to the another computer and executing processing of storing user information of the user in the another computer.

28. The program according to supplementary note 27, wherein a storage unit that stores the user information of the user includes a first storage area and a second storage area, the program further causing the computer to execute a procedure of executing processing of reading, when logging in, in the procedure of logging, to the another computer by using the first authentication information, the user information of the user stored in the first storage area onto the another computer and storing the read user information in the second storage area.

29. The program according to supplementary note 28, wherein a first management-function unit that manages the first storage area and a second management-function unit that manages a second storage area both included in the another computer are associated with business operators different from each other, the program further causing the computer to execute:

a procedure of transferring, when receiving permission information for access to the user information of the user stored in the first storage area from the another computer, the received permission information for access to the second management-function unit of the another computer; and a procedure of causing the second management-function unit of the another computer to acquire, based on the received permission information for access, the user information of the user stored in the first storage area and store the acquired user information in the second storage area.

30. The program according to supplementary note 29, wherein the business operator is a securities company, the user information submitted from the user at a time of account-opening in a first securities company is stored in the first storage area, and the user information used at a time of account-opening in a second securities company is stored in the second storage area, the program further causing the computer to execute a procedure of reading, when receiving, after receiving an account-opening application for the first securities company from a user terminal and storing the user information in the first storage area, an account-opening application for the second securities company, the user information of the user from the first storage area, and storing the read user information in the second storage area.

31. The program according to supplementary note 29 or 30, further causing the computer to execute a procedure of storing the permission information for access in a storage unit in association with at least either one of the first authentication information and the second authentication information.

32. The program according to any one of supplementary notes 28 to 31, wherein the user information includes identity determination information, a confirmation document of the identity determination information, and information relating to an identity verification document, and the storage unit stores the identity-confirmed user information.

33. A program causing a computer, being connected to another computer that receives user information of a user, that manages the user information to execute:

a procedure of transmitting, to the another computer, when storing the user information of the user, first authentication information for logging in to the computer with respect to the user; and a procedure of executing, when receiving the first authentication information, processing of reading the user information of the user.

34. The program according to supplementary note 33, wherein a storage unit that stores the user information of the user includes a first storage area and a second storage area, the program further causing the computer to execute a procedure of executing, when receiving the first authentication information, processing of reading the user information of the user stored in the first storage area and storing the read user information in the second storage area.

35. The program according to supplementary note 34, further causing the computer to execute:

a first management-function procedure of managing the first storage area associated with one business operator; and a second management-function procedure of managing the second storage area associated, differently from the first storage area, with another business operator.

36. The program according to supplementary note 35, further causing the computer to execute:

in the first management-function procedure, a procedure of transmitting, to the another computer, when receiving the first authentication information, permission information for access to the user information of the user stored in the first storage area; and in the second management-function procedure, a procedure of acquiring, based on the permission information for access transferred from the another computer, the user information of the user stored in the first storage area, and storing the acquired user information in the second storage area.

37. The program according to supplementary note 35 or 36, wherein the business operator is a securities company, the user information submitted from the user at a time of account-opening in a first securities company is stored in the first storage area, and the user information used at a time of account-opening in a second securities company is stored in the second storage area, the program further causing the computer to execute a procedure of reading, when receiving, after receiving an account-opening application for the first securities company from a user terminal and storing the user information in the first storage area, an account-opening application for the second securities company, the user information of the user from the first storage area, and storing the read user information in the second storage area.

38. The program according to any one of supplementary notes 34 to 37, wherein the user information includes identity determination information, a confirmation document of the identity determination information, and information relating to an identity verification document, and the storage unit stores the identity-confirmed user information.

DESCRIPTION OF REFERENCE NUMERAL

1 Information processing system
3 Communication network
60 Computer
62 CPU
64 Memory
66 Storage
68 I/O
69 Bus
70 Communication I/F
72 Input apparatus
74 Display apparatus
80 Program
100 Account-opening task server
102 Transmission unit
104 Processing unit
120 Personal information database
120*a* First storage area (securities-company A personal-information database)
120*b* Second storage area (securities-company B personal-information database)
122 First authentication information
124 Confirmed information
126 Personal information
130 Integration unit
134 Processing unit
140*a* First management-function unit (securities-company A management-function unit)
140*b* Second management-function unit (securities-company B management-function unit)
144*a* Processing unit
144*b* Processing unit
200 Agent server
202 ID registration unit
204 Login unit
220 ID storage unit
222 ID information
224 User registration information
226 First authentication information
230 Transfer unit
U1, U2 User terminal

The invention claimed is:

1. An A financial account opening method comprising:

receiving first authentication information for a financial account in response to receiving second authentication information which is entered on a user terminal and receiving information regarding the financial account which is specified on the user terminal; and executing a process for opening the financial account used by the first authentication information in response to receiving personal information for opening the financial account, wherein the personal information is derived by the user terminal through a capture operation of an identity verification document, and the executing the process includes logging in to a financial account-opening task server using the first authentication information to perform the financial account opening on behalf of a user.

2. The financial account opening method according to claim 1, further comprising sending a request regarding the personal information to the user terminal.

3. The financial account opening method according to claim 1, wherein the identity verification document includes at least one of a driver's license or a health insurance card.

4. The financial account opening method according to claim 1, wherein the process for opening the financial account includes storing the personal information in a database regarding the financial account.

5. The financial account opening method according to claim 4, further comprising executing a process for opening a second financial account used by the first authentication information by receiving the personal information transferred from the database regarding the financial account in response to receiving a grant of access permission to the stored personal information.

6. The financial account opening method according to claim 1, wherein the first authentication information includes a user ID.

7. An agent server comprising:

at least one memory storing instructions; and at least one processor configured to execute the instructions to:

receive first authentication information for a financial account in response to receiving second authentication information which is entered on a user terminal and receiving information regarding the financial account which is specified on the user terminal; and execute a process for opening the financial account used by the first authentication information in response to receiving personal information for opening the financial account, wherein the personal information is derived by the user terminal through a capture operation of an identity verification document, and the executing the process includes logging in to a financial account-opening task server using the first authentication information to perform the financial account opening on behalf of a user.

8. The agent server according to claim 7, wherein the at least one processor is further configured to execute the instructions to send a request regarding the personal information to the user terminal.

9. The agent server according to claim 7, wherein the identity verification document includes at least one of a driver's license or a health insurance card.

10. The agent server according to claim 7, wherein the process for opening the financial account includes storing the personal information in a database regarding the financial account.

11. The agent server according to claim 10, wherein the at least one processor configured to execute the instructions to execute a process for opening a second financial account used by the first authentication information by receiving the personal information transferred from the database regarding the financial account in response to receiving a grant of access permission to the stored personal information.

12. The agent server according to claim 7, wherein the first authentication information includes a user ID.

* * * * *